United States Patent
Wang et al.

(10) Patent No.: US 7,519,027 B2
(45) Date of Patent: *Apr. 14, 2009

(54) METHOD AND APPARATUS FOR PERFORMING IDLE HANDOFF IN A MULTIPLE ACCESS COMMUNICATION SYSTEM

(75) Inventors: Jun Wang, San Diego, CA (US); Edward G. Tiedemann, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 11/357,282

(22) Filed: Feb. 17, 2006

(65) Prior Publication Data

US 2006/0140152 A1 Jun. 29, 2006

Related U.S. Application Data

(63) Continuation of application No. 09/626,758, filed on Jul. 27, 2000, now Pat. No. 7,006,470, which is a continuation of application No. 09/168,191, filed on Oct. 7, 1998, now Pat. No. 6,178,164.

(60) Provisional application No. 60/061,626, filed on Oct. 9, 1997.

(51) Int. Cl.
    *H04Q 7/22* (2006.01)
(52) U.S. Cl. .................. 370/331; 370/335; 455/438
(58) Field of Classification Search .................. 370/331, 370/329, 335; 455/436, 437, 438
    See application file for complete search history.

(56) References Cited

U.S. PATENT DOCUMENTS

| 4,475,010 | A | * | 10/1984 | Huensch et al. | ............. 370/334 |
| 4,901,307 | A | * | 2/1990 | Gilhousen et al. | ............ 370/320 |
| 5,101,501 | A | * | 3/1992 | Gilhousen et al. | ............ 455/442 |
| 5,103,459 | A | * | 4/1992 | Gilhousen et al. | ............ 370/206 |

(Continued)

FOREIGN PATENT DOCUMENTS

EP 0641135 * 3/1995

(Continued)

*Primary Examiner*—Min Jung
(74) *Attorney, Agent, or Firm*—Kent Douglas Baker; Darrell Scott Juneau; Thomas R. Rouse

(57) ABSTRACT

In a mobile communication system having a first communication device for communicating with a plurality of second communication devices, a method for performing handoff within the mobile communication system includes transmitting from at least one of the second communication devices to the first communication device a handoff list of second communication devices to which the first communication device is permitted to handoff. A channel assignment message is transmitted from each of the second communications devices in the handoff list. The handoff list includes base stations controlled by a single controller that determines which of the second communication devices transmits the channel assignment message. The base stations on the handoff list have pilot signals and the energy levels of the pilot signals are measured by the first communication device. The measured energy levels are transmitted to the controller and compared by the controller to provide an energy level list of base stations according to the comparing. The energy level list is transmitted to the first communication device and the handoff is performed according to the energy level list.

24 Claims, 4 Drawing Sheets

U.S. PATENT DOCUMENTS

| | | | |
|---|---|---|---|
| 5,109,390 A | | 4/1992 | Gilhousen et al. |
| 5,267,261 A | * | 11/1993 | Blakeney, II et al. ........ 370/332 |
| 5,392,287 A | * | 2/1995 | Tiedemann et al. ......... 370/311 |
| 5,428,816 A | * | 6/1995 | Barnett et al. ............... 455/437 |
| 5,432,843 A | * | 7/1995 | Bonta ......................... 455/438 |
| 5,509,015 A | * | 4/1996 | Tiedemann et al. ......... 370/311 |
| 5,541,978 A | * | 7/1996 | Brunner et al. ............. 455/423 |
| 5,544,196 A | * | 8/1996 | Tiedemann et al. ......... 375/145 |
| 5,561,838 A | * | 10/1996 | Chandos et al. ............ 455/13.1 |
| 5,574,968 A | * | 11/1996 | Olds et al. ................... 455/428 |
| 5,594,943 A | * | 1/1997 | Balachandran .............. 455/436 |
| 5,640,676 A | * | 6/1997 | Garncarz et al. ............ 455/436 |
| 5,640,677 A | * | 6/1997 | Karlsson ..................... 455/434 |
| 5,673,259 A | * | 9/1997 | Quick, Jr. .................... 370/342 |
| 5,678,184 A | * | 10/1997 | Cutler et al. ................. 455/436 |
| 5,737,705 A | * | 4/1998 | Ruppel et al. ............ 455/452.2 |
| 5,839,070 A | * | 11/1998 | Lupien et al. ............... 455/440 |
| 5,991,626 A | * | 11/1999 | Hinz et al. ................... 455/436 |
| 6,021,122 A | | 2/2000 | Tiedemann, Jr. |
| 6,026,301 A | * | 2/2000 | Satarasinghe ............... 455/436 |
| 6,810,254 B2 | * | 10/2004 | Tiedemann et al. ......... 455/437 |

FOREIGN PATENT DOCUMENTS

| | | | |
|---|---|---|---|
| GB | 2322046 | * | 8/1998 |
| WO | WO9747154 | * | 12/1997 |

* cited by examiner

METHOD AND APPARATUS FOR PERFORMING IDLE HANDOFF IN A MULTIPLE ACCESS COMMUNICATION SYSTEM

CLAIM OF PRIORITY UNDER 35 U.S.C. §120

The present Application for Patent is a Continuation of patent application Ser. No. 09/626,758 entitled "Method and Apparatus for Performing Idle Handoff in a Multiple Access Communication System" filed Jul. 27, 2000 now U.S. Pat. No. 7,006,470, now allowed, which is a Continuation of patent application Ser. No. 09/168,191, filed Oct. 7, 1998, entitled "Method and Apparatus for Performing Idle Handoff in a Multiple Access Communication System," now issued as U.S. Pat. No. 6,178,164, which claims priority to Provisional Patent Application No. 60/061,626, filed Oct. 9, 1997, and assigned to the assignee hereof and hereby expressly incorporated by reference herein.

BACKGROUND

I. Field

The present invention relates to communication systems. More particularly, the present invention relates to a novel and improved method and apparatus for performing idle handoff in a multiple access communication system. In addition, the present invention relates to an improved method for assigning a traffic channel in a multiple access communication system. The invention also relates to a method for reducing the number of required handoffs occurring while a mobile station is queued and waiting for a traffic channel in a multiple access communications system.

II. Background

Typically, communications systems prohibit handoffs while a mobile station is in a system access state. The system access state is the state in which communications are initiated either by the mobile station by means of transmissions over an access channel or by a base station by means of transmissions over a paging channel. In the exemplary embodiment, messages are sent in accordance with a code division multiple access (CDMA) communication format, which is disclosed in detail in U.S. Pat. No. 4,901,307 entitled "Spread Spectrum Multiple Access Communication System Using Satellite or Terrestrial Repeaters" and U.S. Pat. No. 5,103,459 entitled "System and Method for Generating Waveforms in a CDMA Cellular Telephone System," both of which are assigned to the assignee of the present invention and are incorporated by reference herein. The use of paging and access channels for call initiation is well known in the art and is detailed in TIA/EIA Interim Standard IS-95-A, entitled "Mobile Station-Base Station Compatibility Standard for Dual Mode Wideband Spread Spectrum Cellular System."

One of the characteristics of CDMA systems is that the same frequency is reused in every cell. Diversity combining is a method by which a receiver receiving signals carrying the same information combines the signals which are propagated through different paths to provide an improved estimate of a transmitted signal. A receiver design for taking advantage of the diversity signals carrying the same information but traveling through different propagation paths or transmitted by different transmitters is described in U.S. Pat. No. 5,109,390 entitled "Diversity Receiver in a CDMA Cellular Telephone System," assigned to the assignee of the present invention and incorporated by reference herein.

Soft hand off is a method by which a mobile station moving from one cell into another receives information from the base stations serving the two or more cells at the boundary area as long as the mobile station is located near the boundary. The signals which are sent by the base stations are combined in the receiver of the mobile station by the diversity combining method mentioned above. A method and system for providing soft hand-off in a CDMA communication system, where a plurality of base stations are in communication with a mobile station at or near cell boundaries is disclosed in U.S. Pat. No. 5,101,501 entitled "Method and System for Providing a Soft Handoff in Communications in a CDMA Cellular Telephone System," and U.S. Pat. No. 5,267,261 entitled "Mobile Station Assisted Soft Handoff in a CDMA Cellular Communications System," both of which are assigned to the assignee of the present invention and incorporated by reference herein. Hard handoff is, in contrast to soft handoff, where a mobile station passing from one cell to another is dropped by the cell being exited prior to being picked up by the cell being entered.

The use of the same frequency in every cell and the use of soft handoff result in high CDMA system capacity. The reuse of the same frequency in neighboring cells causes rather rapid changes in the forward link signal to noise ratio near cell boundaries. This is because the cell being received by the mobile station may fade and the neighboring cell may increase in strength (anti-fade).

Generally, when the mobile station receives two cells, the received traffic channel energy per spreading chip to total spectral noise density for the signal transmitted by cell 1 is given by equation (1) below:

$$\frac{E_c}{I_o}1 = \frac{\frac{E_c}{I_{or}}1}{\frac{I_{oc}}{\hat{I}_{or1}} + \frac{\hat{I}_{or2}}{\hat{I}_{or1}} + 1} \quad (1)$$

And the received traffic channel energy per spreading chip to total spectral noise density for the signal transmitted by cell 2 is given by equation (2) below:

$$\frac{E_c}{I_o}2 = \frac{\frac{E_c}{I_{or}}2}{\frac{I_{oc}}{\hat{I}_{or2}} + \frac{\hat{I}_{or1}}{\hat{I}_{or2}} + 1} \quad (2)$$

where in equations (1) and (2)
  $I_{OC}$ is the total thermal noise,
  $E_c/I_{or1}$, $E_c/I_{or2}$ are the fraction of traffic channel power transmitted by
    cell 1 and
    cell 2 respectively, and
  $\hat{I}_{or1}, \hat{I}_{or2}$ are the fraction of traffic channel power received at the mobile station from cell 1 and cell 2 respectively.

Consider $I_{OC}$ to be small relative to $\hat{I}_{or1}$ and $\hat{I}_{or2}$. When cell 1 fades relative to cell 2, $\hat{I}_{or1}$ becomes small relative to $\hat{I}_{or2}$ and the ratio $$\hat{I}_{or2}/\hat{I}_{or1}\frac{\hat{I}_{or2}}{\hat{I}_{or1}}$$

therefore becomes large.

Thus, $$E_c/I_{o1} \frac{E_c}{I_o}1$$

becomes small. If the mobile station is not in soft handoff this change in signal to noise ratio can cause problems. However, if the mobile station is in soft handoff with the neighboring cell, then the change in signal to noise ratio is not a problem because the mobile station is performing diversity combining of the forward traffic channels from both cells. While the first path given by $$E_c/I_{o1} \frac{E_c}{I_o}1$$

becomes small, the second path given by $$E_c/I_{o2} \frac{E_c}{I_o}2$$

becomes large. Thus, fading by one cell increases the signal to noise ratio from the other cell.

Paging is a method of sending information to a mobile station indicating the initiation of mobile terminated service or instructing the mobile to receive new overhead information. A method for initiating a base station initiated call is described in detail in U.S. Pat. No. 5,392,287, entitled "Apparatus and Method for Reducing Power Consumption in a Mobile Communications Receiver" and in copending U.S. patent application Ser. No. 08/206,701, filed Mar. 7, 1994, which is a continuation of U.S. Pat. Ser. No. 5,392,287, both of which are assigned to the assignee of the present invention and are incorporated by reference herein. The present invention is equally applicable to mobile station initiated calls, the method for which is described in copending U.S. patent application Ser. No. 08/219,867, filed Jan. 18, 1996 which is assigned to the assignee of the present invention and is incorporated by reference herein.

In a slotted paging system, a mobile station monitors the paging channel for a short predetermined interval of time and then does not monitor the paging channel again until the next predetermined time interval. In IS-95-A this method of periodically monitoring the paging channel is called slotted mode and the mobile station may monitor the paging channel for 80 ms. every 1.28 seconds. The period between monitoring intervals can be made longer as desired by the user. Before each predesignated time slot in which a mobile station can be paged, the mobile station wakes up (becomes active) and resynchronizes or improves its synchronization with the base station. The mobile station then monitors for pages or other messages in the slot. After an interval, the mobile station can become inactive and not monitor the paging channel until just before the next assigned slot.

Prior to the time when a mobile station actively communicates traffic information with the mobile communication system and after the time when the mobile station achieves timing synchronization with the communication system, the mobile station is in the idle state. In the idle state the mobile station can receive messages, receive an incoming call, initiate a call, initiate registration, or initiate message transmission. When in the mobile station idle state, IS-95-A permits the mobile station to perform an idle handoff at any time other than the interval that the mobile station is required to monitor its assigned slot.

However, when the mobile station originates a call or receives a page it enters the system access state to send an origination message or a page response message. While in the system access state an IS-95-A mobile station does not operate in the slotted mode. This is called non-slotted operation. Specifically, the mobile station continually monitors the paging channel until directed by the base station to a different state or an error condition occurs permitting the mobile station to exit the system access state. The exemplary embodiment will be described in the context of the origination operation and origination message, but the concepts directly apply to the mobile terminated call process and page response message. After the mobile station sends the origination message and receives an acknowledgment, the mobile station waits for a channel assignment message, which indicates upon which channel traffic communications from the base station to the mobile station will be conducted.

Upon receipt of the channel assignment message, the mobile station tunes to the allocated traffic channel, receives information on the forward traffic channel, and begins to transmit on the reverse traffic channel. The forward traffic channel is the channel upon which information from the base station to the mobile station is sent and the reverse traffic channel is the traffic channel upon which information from the mobile station to the base station is sent.

The interval between the time that the mobile station sends the origination message and the time when the mobile station receives the channel assignment message depends upon the implementation of the individual infrastructure vendor. It can range from less than one-half of a second to several seconds. Until the time that the mobile station receives the channel assignment message the mobile station is in the system access state.

The paging channel typically does not support soft handoff. Thus, the issues of fading previously described occur. These are typically counteracted by having the radiated power of the paging channel higher than the traffic channel. Since one paging channel can handle the call origination and termination of many traffic channels the loss in capacity by this higher power is minimal. In order to support soft handoff on the paging channel, the system sends the same information on the paging channel in all cells, thus dramatically reducing the overall capacity of the paging channel.

While in the idle state, the mobile station is permitted to perform handoffs. Typically, the mobile station performs a handoff whenever the received signal level from one cell gets sufficiently above another cell. This idle handoff is typically done before the mobile station begins monitoring the slot. However, there can be cases in which the mobile station is unable to choose the correct cell before the slot begins and the mobile station must continue to monitor the existing cell. While in the system access state the mobile station is not permitted to perform idle handoffs.

However, when the mobile station is in the system access state there can be cases in which the change in signal to noise ratio, $E_c/I_{o1}$, is so rapid that the message error rate becomes too high and the mobile station cannot correctly receive the signaling messages sent on the paging channel. As a result the mobile station may not receive the channel assignment message. This causes the call origination to be unsuccessful. IS-95-A permits the mobile station to exit the system access state and return to the mobile station idle state if it does not receive any paging channel messages for one second. Thus, the mobile station does not receive the channel assignment message and the call origination is unsuccessful.

A similar problem exists when the mobile station is first assigned to the traffic channel. IS-95-A permits only a single base station to be assigned to the mobile station. If another cell is strong or becomes stronger the mobile station may not be able to receive the forward traffic channel successfully. As a result the call may drop. The problem is that the mobile station is assigned to a traffic channel with a single active set member and is not in soft handoff.

Under IS-95-A in order for the mobile station to enter into soft handoff the following steps must occur. First, the mobile station must determine that the pilot of another base station is above a predetermined energy threshold value. Second, the mobile station must send a pilot strength measurement message. Third, the infrastructure must set up the handoff and send the handoff direction message to the mobile station. Depending upon the circumstances and the implementation, this may take from a few hundred milliseconds to considerably more than one second.

Thus, although soft handoff is generally supported in IS-95-A systems, soft handoff is not supported when the mobile station is in the system access state. There is therefore a need for a system that permits soft handoff while the mobile station is in the system access state to provide increased reliability in the system access process and other benefits.

SUMMARY

In a mobile communication system having a first communication device for communicating with a plurality of second communication devices, a method for performing handoff within the mobile communication system includes transmitting from at least one of the second communication devices to the first communication device a handoff list of second communication devices to which the first communication device is permitted to handoff. A channel assignment message is transmitted from each of the second communications devices in the handoff list. The handoff list includes base stations controlled by a single controller that determines which of the second communication devices transmits the channel assignment message.

The base stations on the handoff list have pilot signals and the energy levels of the pilot signals are measured by the first communication device. The measured energy levels are transmitted to the controller and compared by the controller to provide an energy level list of base stations according to the comparing. The energy level list is transmitted to the first communication device and the handoff is performed according to the energy level list.

The present invention describes further modifications which can improve operation on the paging and access channels. The present invention thus permits handoffs while the mobile station is in the system access state. This permits the mobile station to receive a base station whose signal-to-noise ratio is high so that the message error rate is low. It avoids dropped call setups due to an inability to receive the paging channel.

Another feature of the present invention is that it permits the infrastructure to determine which base stations should send the channel assignment message to the mobile station. This assures that the mobile station is able to handoff to a different base station and have a traffic channel allocated to it on the new base station without delay.

A further feature of the present invention is that it permits the infrastructure to determine which base stations should be in the active set of the mobile station before the mobile station is assigned to a traffic channel. The active set is a set of base stations providing the strongest signals to the mobile station. This permits the infrastructure to determine, before the mobile station is assigned to the traffic channel, whether there are sufficient resources to place the mobile station into soft handoff. This is useful because a mobile station near the cell boundary may immediately request to be placed into soft handoff after it is assigned to the traffic channel. Furthermore, this minimizes call drops due to the rapid changes in signal-to-noise ratio mentioned previously.

Finally the features presented above provide special utility in the priority access and channel allocation (PACA) operation which allows for users to gain access to limited communication resources in accordance with designated user priorities. While the invention is described in terms of a CDMA system, the invention is applicable to any cellular or satellite communications system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
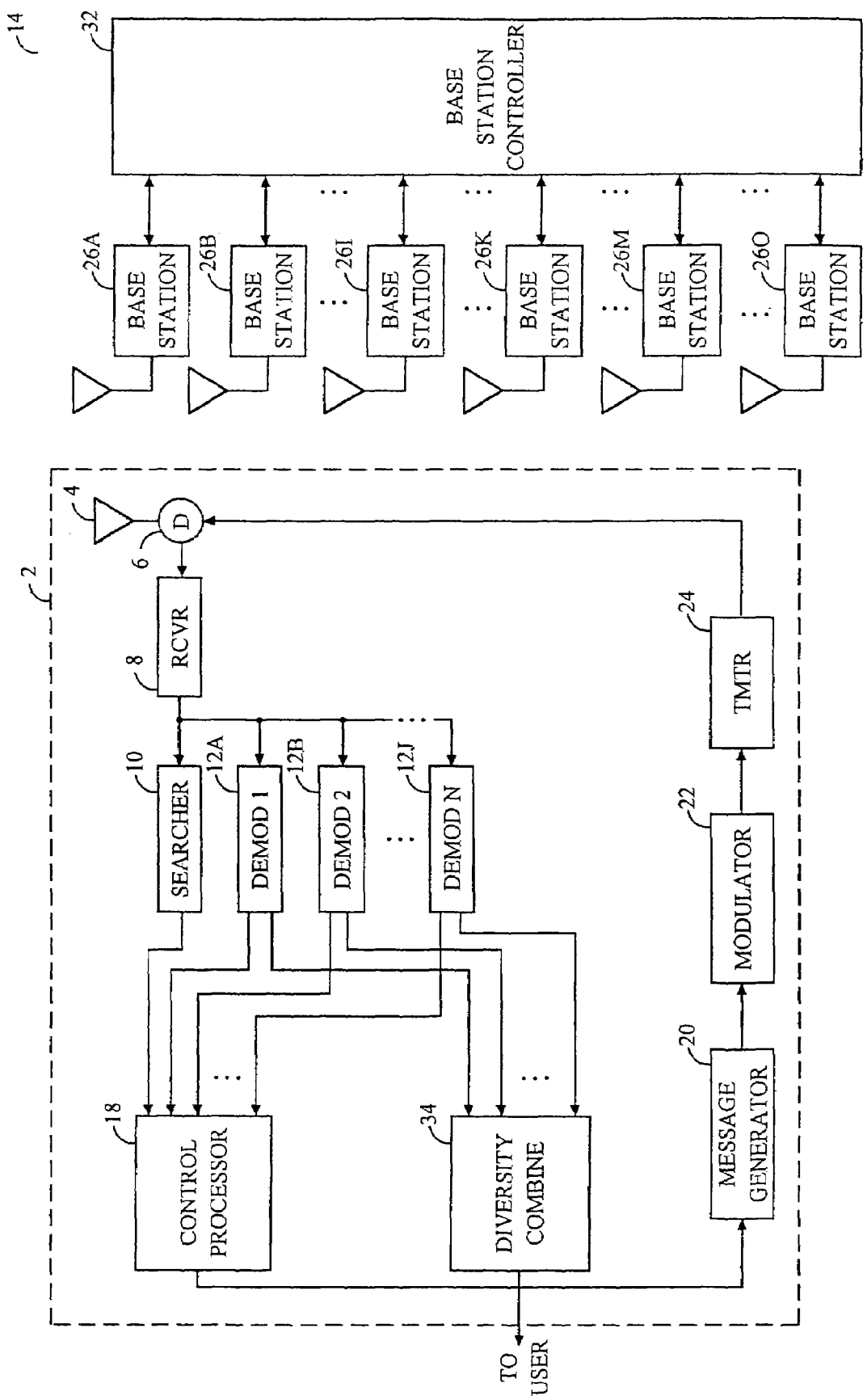
FIG. 1 is a block diagram of the communication system of the present invention including a mobile station communicating with a base station of a group of base stations.
Figure 2:
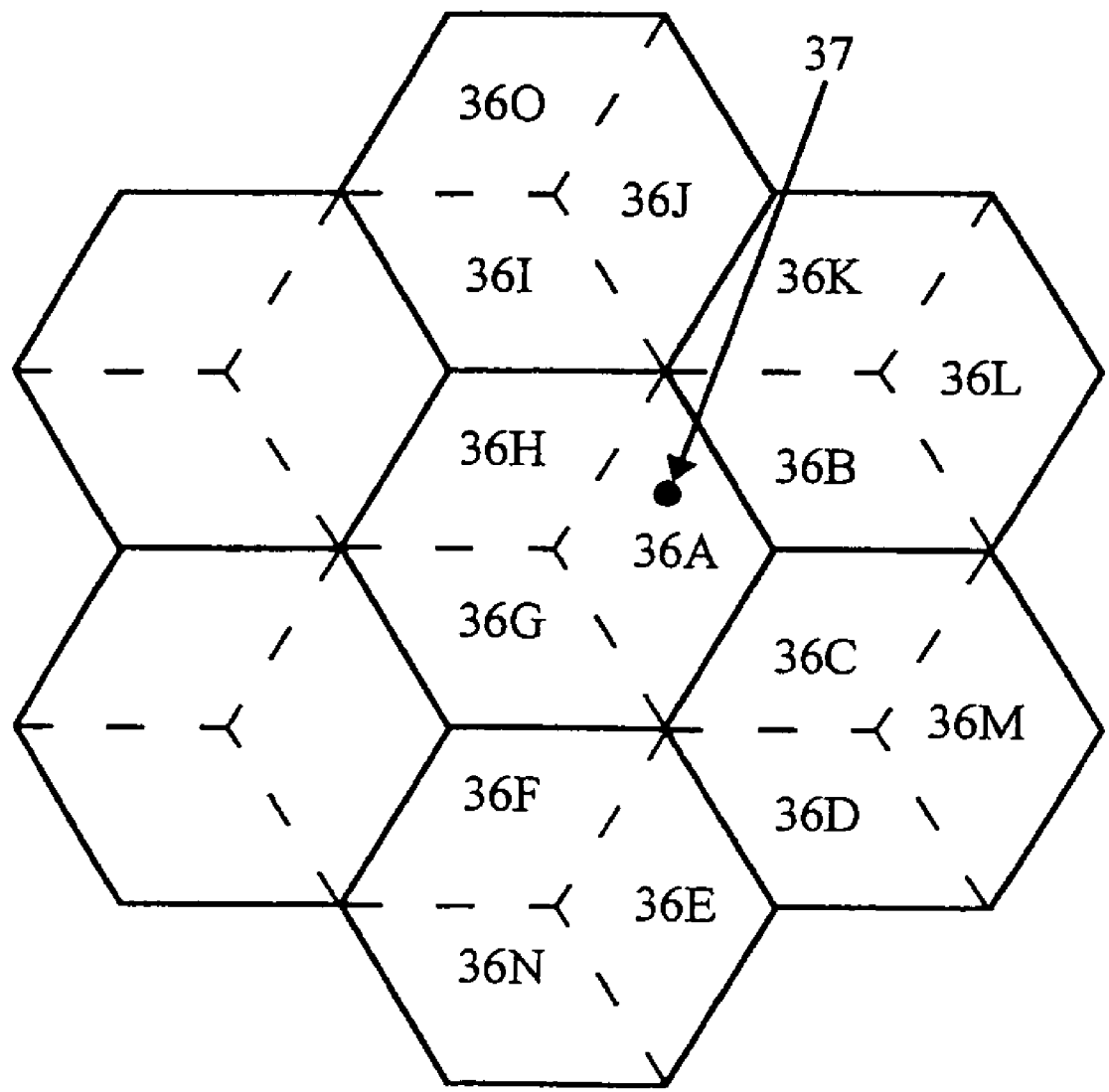
FIG. 2 shows a layout of cells corresponding to the base stations of FIG. 1.
Figure 3A:
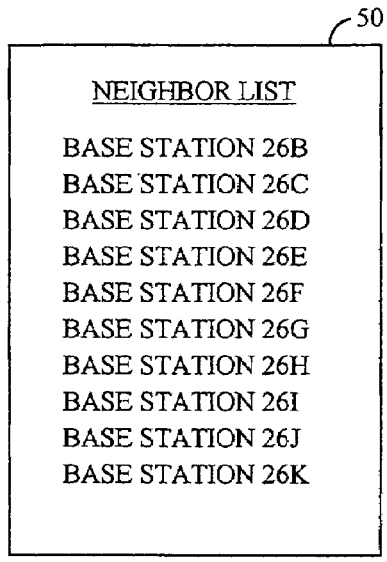
FIGS. 3A-D show base station lists transmitted to the mobile station in the communication system of FIG. 1.
Figure 3B:
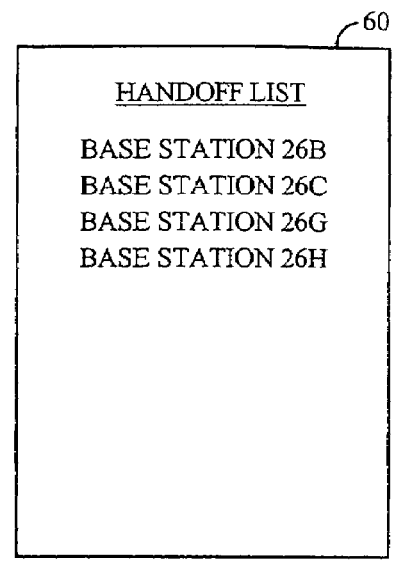
Figure 3C:
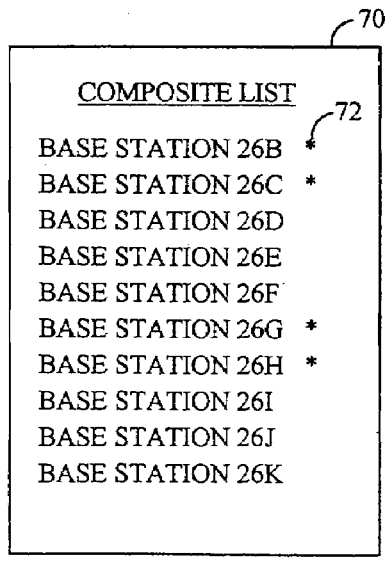
Figure 3D:
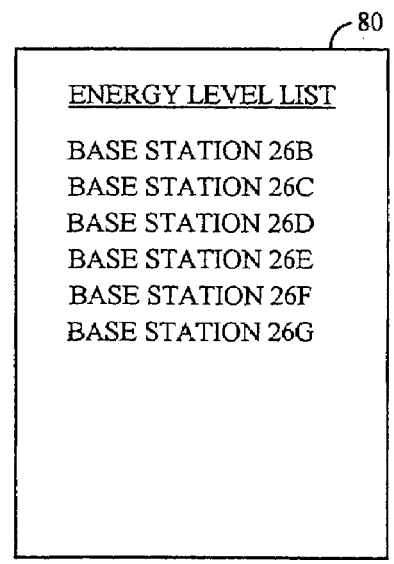

Referring now to FIG. 1, there is shown communication system 14. Communication system 14 includes mobile station 2 having a control processor 18 and base stations 26a-o. In the exemplary embodiment base stations 26a correspond to cells 36a in FIG. 2, respectively. Thus, for example, base station 26a provides coverage for cell 36a. Upon power-up mobile station 2 enters the system determination substate. A system determination processor (not shown) selects a system upon which to perform an acquisition attempt and provides the necessary frequency information to receiver 8. Although not separately shown, the system determination processor can be implemented within control processor 18. Control processor 18 can be implemented in a microprocessor or microcontroller operating under program control stored in memory.

In the exemplary embodiment mobile station 2 moves into the pilot acquisition substate in which it attempts to demodulate a pilot signal based upon the acquisition parameters received in the system determination substate and attempts to acquire a CDMA pilot signal in accordance with the acquisition parameters. Signals (if present) are received at antenna 4 and passed through duplexer 6 to receiver 8. Receiver 8 downconverts, amplifies the received signal, converts the analog signal to a digital representation, and passes the signal to searcher 10. Searcher 10 attempts to acquire a pilot signal by testing pseudorandom noise (PN) offsets. A PN offset is tested by demodulating the signal in accordance with the PN offset hypothesis and measuring the signal energy of the demodulated signal. Design and implementation of searcher hardware for CDMA acquisition is known in the art and is described in detail in aforementioned U.S. Pat. No. 5,109,390.

When searcher 10 detects a pilot signal with energy above a predetermined threshold value, mobile station 2 enters the synchronization channel acquisition substate and attempts acquisition of the synchronization channel. Typically, the synchronization channel as broadcast by the base stations includes basic system information such as the system identification (SID) and the network identification (NID), but most importantly provides timing information to mobile station 2. Mobile station 2 adjusts its timing in accordance with the synchronization channel information and then enters the mobile station idle state.

Upon successful acquisition of the synchronization channel, mobile station 2 begins to monitor the paging channel in accordance with a predetermined paging format. Mobile station 2 demodulates a signal based on a predetermined Walsh sequence that is reserved for paging channel transmissions. For example if the acquired pilot signal is transmitted by base station 26a mobile station 2 monitors the paging channel in accordance with timing information provided by the synchronization channel and using a predetermined Walsh sequence. Base station 26a intermittently transmits overhead information on the paging channel.

Referring now to FIGS. 3A-D, there are shown base station lists 50, 60, 70, 80 transmitted to mobile station 2 for permitting idle hand-off within communication system 9 of the present invention. In IS-95-A neighbor list 50 is provided to mobile station 2 by base stations 26a-n in the neighbor list message. Neighbor list 50 is also referred to herein as NGHBR_LIST_BASE 50. NGHBR_LIST_BASE 50 is a list of base stations 26b-k in the geographic vicinity of base station 26a that can provide strong signals to mobile station 2 and thus are candidates for idle handoff of mobile station 2.

Base station controller 32 is responsible for providing information between base stations 26a-o, for selectively providing information from a main telephone switching office (not shown) to base stations 26a-o and for providing base stations 26a-o with internally generated messages. It should be noted that the present invention is equally applicable to the case where some of the base stations in neighbor list 50 are not controlled by the same base station controller 32.

If the pilot signal acquired by mobile station 2 is transmitted by base station 26a after receiving the overhead information, mobile station 2 may register with base station 26a by transmitting its mobile identification number to base station 26a. Mobile station 2 then enters the idle state and monitors its allocated paging channel in the slotted paging mode after successful registration with base station 26a. If registration is not performed, mobile station 2 also enters the idle state and monitors, in the slotted paging mode, its allocated paging channel which is transmitted by base station 26a.

In slotted paging mode, base station 26a transmits any paging or signaling information directed to mobile station 2 at predetermined time intervals called time slots. In the exemplary embodiment the time slots and paging channel are determined in accordance with a hashing function of the mobile identification number which upon registration is known to base station 26a and mobile station 2.

In the present invention base station 26a transmits to mobile station 2 handoff list 60 of base stations to which mobile station 2 is permitted to perform idle handoff while in the system access state. Handoff list 60 is also referred to herein as LIST_BASE 60. Base stations in LIST_BASE 60 are typically a subset of the base stations in NGHBR_LIST_BASE 50 and typically use the same base station controller 32. For example, NGHBR_LIST_BASE 50 may include all base stations 26b-k, but LIST_BASE 60 may include only base stations 26b, 26c, 26g, and 26h.

When mobile station 2 originates a call message generator 20 generates an origination message and transmits it on the access channel. Message generator 20 can be implemented in a microprocessor programmed to carry out the functions described. Although illustrated as a separate element message generator 20 can be implemented within control processor 18. The origination message is received and demodulated by base station 26a which the mobile station is currently monitoring. In response to receiving the origination message each base station in LIST_BASE 60 transmits a channel assignment message indicating a traffic channel upon which communications can be conducted. Typically the Walsh channel used for communications with a first base station in LIST_BASE 60 is not necessarily the same Walsh channel used for communications with a second base station in LIST_BASE 60. Because a plurality of base stations send a channel assignment message the mobile station 2 can perform an idle handoff while in the system access state and after sending the origination message to any base station which is in system access and still be able to receive the channel assignment message.

In an alternative embodiment mobile station 2 sends the origination message to base station 26a and then waits for an acknowledgment of the origination message. Until mobile station 2 receives the acknowledgment mobile station 2 is not permitted to perform a handoff. However, after mobile station 2 receives the acknowledgment it can perform an idle handoff to any base station in LIST_BASE 60.

In another alternative embodiment mobile station 2 sends the origination message using the procedures described in IS-95-A as described in detail in copending U.S. patent application Ser. No. 08/412,648, entitled "Random Access Channel," filed Mar. 12, 1994 assigned to assignee of the present invention and incorporated by reference herein. If an acknowledgment is not received from base station 26a within a predetermined timeout period the mobile station increases its transmit power and attempts to send the message again. If mobile station 2 is unable to receive an acknowledgment from base station 26a after a certain number of attempts and another base station, for example base station 26b, is stronger, mobile station 2 is permitted to perform an idle handoff to base station 26b and restart the transmission of the origination message.

In one embodiment each of the base stations in LIST_BASE 60 transmits a channel assignment message only indicating a traffic channel for communication with itself. In an alternative embodiment each base station 26a-i in LIST_BASE 60 transmits an identical channel assignment message that indicates not only the traffic channel to be used for communications with that particular base station but also indicates the traffic channel to be used for communications with all base stations in LIST_BASE 60. This requires the base stations in LIST_BASE 60 to communicate the available traffic channels through base station controller 32. By providing channel assignment messages from a plurality of base stations, the success rate of the channel assignment process is greatly enhanced.

The above process permits the infrastructure to set up soft handoff and include more than one member of the active set in the channel assignment message. Instead of first communicating with one base station and then moving into soft hand off it is thus possible for mobile station 2 to come up immediately in a soft handoff state and immediately receive traffic communication from two or more base stations. This speeds up the process of getting mobile station 2 into soft handoff, which improves performance of communication system 9, and minimizes call drops due to a low forward traffic channel signal to noise ratio.

In one embodiment of this process the base station sets up soft handoff with all base stations in LIST_BASE 60. In an alternative embodiment of this process the base station sets up soft handoff with a subset of base stations in LIST_BASE 60 and sends the information in the channel assignment message necessary for mobile station 2 to enter into soft handoff. This information includes the identities of this subset of base stations. In IS-95-A the pilot PN offset identifies the base station.

The paging messages sent by base stations 26a-i are received at antenna 4 of mobile station 2. The received messages are then provided through duplexer 6 to receiver 8 where the received signal is down converted and amplified. The down converted messages are provided to demodulators 12a-j which demodulate the received messages. Control processor 18 in accordance with information from searcher 10 selects the incoming paging channel or channels that mobile station 2 demodulates. In one embodiment demodulators 12a-j monitor only one base station.

Searcher 10 in cooperation with control processor 18 can determine that another base station is better. The demodulators then demodulates the received signal from the other base station. Because mobile station 2 receives an assignment message from more than one base station mobile station 2 can perform an idle handoff while in the system access state. In another embodiment mobile station 2 monitors all base stations in LIST_BASE 60 and demodulates signals identified in LIST_BASE 60.

In one preferred embodiment LIST_BASE 60 is not provided separately from neighbor list 50 in the neighbor list message. Rather, composite list 70 including all of the members of neighbor list 50 is provided. Flag 72 is also included within composite list 70 to indicate which members of neighbor list 50 are also members of LIST_BASE 60. In the exemplary embodiment one of the reserved values 72 in the overhead message is used to indicate which base stations specified in the neighbor list message are in LIST_BASE 60. In an IS-95-A base station reserved values 72 are provided in the overhead message to specify which members of neighbor list 50 are in LIST_BASE 60.

In the exemplary embodiment the IS-95-A neighbor list message includes the pilot PN offsets for base stations in the NGHBR_LIST_BASE 50 and an indication of which base stations in the neighbor list message are in LIST_BASE 60. The pilot PN sequence for the current base station is transmitted to provide a reference to mobile station 2 for identifying the other base station PN offsets.

As described above all base stations in LIST_BASE 60 are required to send channel assignment messages to mobile station 2. While this permits mobile station 2 to handoff and thus increases the success rate of the channel assignment process, it requires additional paging channel capacity for all call setups.

A modification of this procedure that reduces the impact upon the paging channel capacity is sending a list of base station pilots which are above a predetermined power threshold to mobile station 2. This list is LIST_MOBILE 80 which is also referred to as energy list 80. In one embodiment searcher 10 demodulates pilot signals with a preference for the PN offsets of the base stations in LIST_BASE 60 followed by the PN offsets of base stations in NGHBR_LIST_BASE 50 and then in accordance with the remaining PN offsets. A method for providing an optimized search prioritization is described in the aforementioned U.S. Pat. No. 5,267,261.

In the exemplary embodiment searcher 10 demodulates the received signals according to a pilot PN offset and measures the energy of the demodulated pilot. The energy values are provided to control processor 18. Control processor 18 compares the energy of the demodulated signal with a threshold value and compiles energy list 80. Energy list 80 contains a list of PN offsets that are above the energy threshold used by control processor 18. Energy list 80 can be designated LIST_MOBILE 80. Once LIST_MOBILE 80 has been compiled it is transmitted on the access channel and received by base station 26a which mobile station 2 is monitoring. In the exemplary embodiment LIST_MOBILE 80 is included in the origination message.

In another embodiment LIST_MOBILE 80 is received by more than one base station 26a-o. LIST_MOBILE 80 is provided to base station controller 32. In the preferred embodiment the threshold used by mobile station 2 to determine whether to include a base station in LIST_MOBILE 80 is sent as part of the overhead messages by base stations 26a-o. In the preferred embodiment the threshold can be the T_ADD value sent in the IS-95-A system parameter message. This T_ADD value is currently used by the IS-95-A mobile stations to determine whether to send the IS-95-A pilot strength measurement message on the traffic channel to the base station indicating that the mobile station has detected a pilot exceeding T_ADD.

Figure 4:
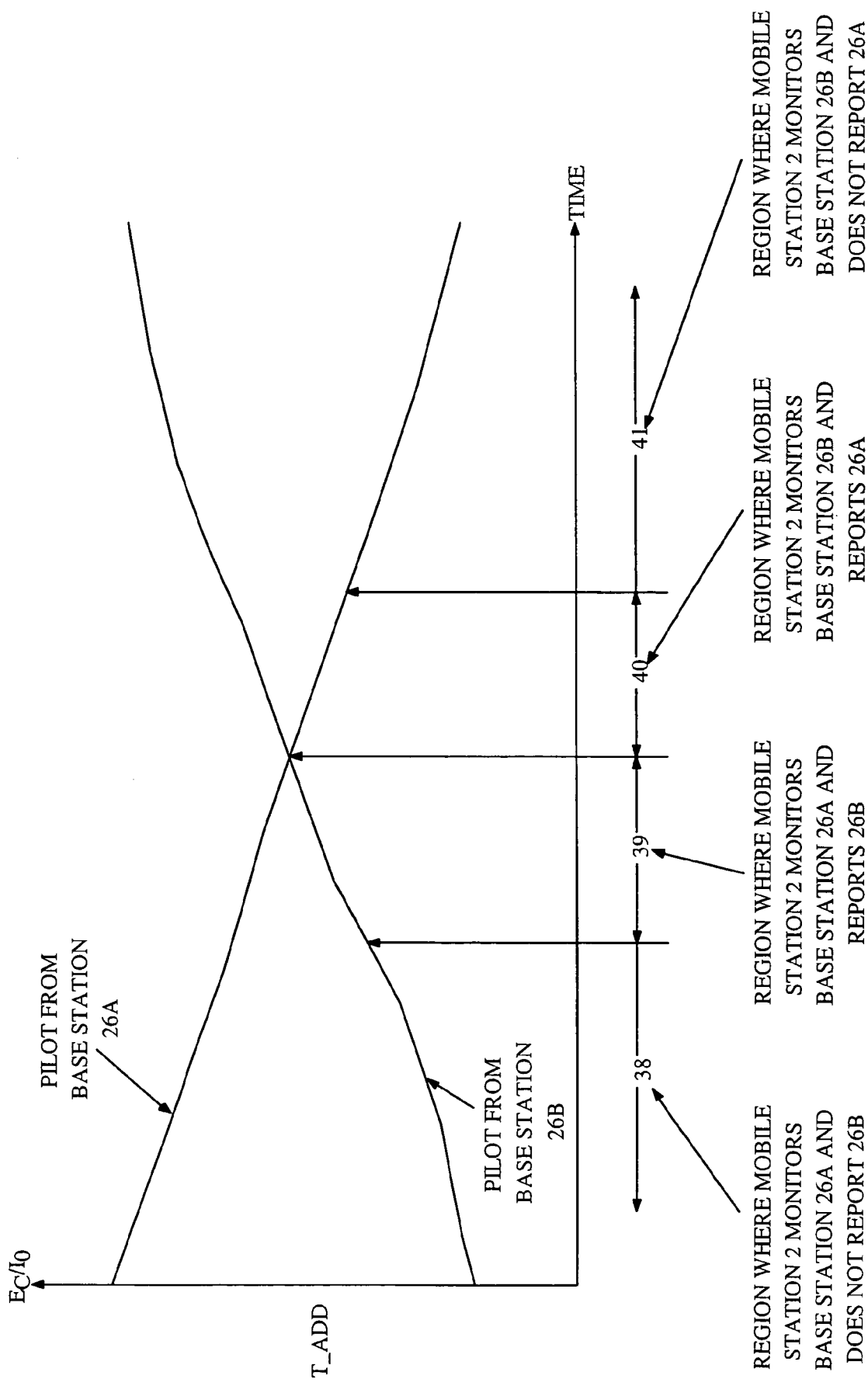
FIG. 4 shows the pilot Ec/I0 for a mobile station moving between two base stations.

Referring now to FIG. 4., there is shown a graphical representation of Ec/I0 for the IS-95-A pilot channel broadcast by base stations 26a,b as mobile station 2 moves away from base station 26a towards base station 26b. When mobile station 2 is fully within the coverage of base station 26a, as indicated by region 38, the pilot channel of base station 26b is below the T_ADD level. Similarly, when mobile station 2 is fully within the coverage of base station 26b, as indicated by region 41, the pilot channel of base station 26a is below the T_ADD level. When mobile station 2 is in region 38, it does not report in the origination message base station 26b. Similarly, when mobile station 2 is in region 41, it does not report, in the origination message, base station 26a.

When mobile station 2 is in region 39 the pilot Ec/I0 for base station 26b is above T_ADD and the mobile station reports base station 26b in the origination message. Similarly, when mobile station 2 is in region 40 the pilot Ec/I0 for base station 26a is above T_ADD and the mobile station 2 reports base station 26a in the origination message. The preferred embodiment uses Ec/I0 as disclosed in IS-95-A for these measures. However, alternative measures of signal strength or signal to noise ratio which are well known in the art are equally applicable.

In the preferred embodiment mobile station 2 is permitted to perform an idle handoff only to base stations in both LIST_MOBILE and LIST_BASE 60. The set of base stations in both lists can be designated LIST_BOTH. This has two advantages. First, the infrastructure need only send the channel assignment message in those base stations identified by the mobile station as possible candidates for an idle handoff and which the mobile station is permitted to handoff. This is the set of base stations given in LIST_BOTH. This significantly reduces the additional messaging that is required. Second, LIST_MOBILE provides a list of pilots above T_ADD to base station controller 32. This permits the infrastructure to identify which base stations should be a member of the active set of the mobile station. Thus, for base station controller 32 to set up soft handoff when the mobile station is assigned to a traffic channel it can set up soft handoff only with the base stations in LIST_MOBILE.

In an alternative embodiment mobile station 2 sends the base stations in LIST_BOTH to the base station in its origination message. This reduces the amount of information that must be sent from mobile station 2. Furthermore, it permits the infrastructure to set up soft handoff and include more than one member of the active set in the channel assignment message. The channel assignment message would include the pilot PN offsets of base stations which are in the active set. It is possible for the mobile station 2 to come up immediately in a soft handoff state and immediately receive traffic communication from two or more base stations, instead of first communicating with one base station and then moving into soft hand-off which may not be possible due to capacity or other limitations.

For example, if mobile station 2 is at location 37 in cell 36*a* near the boundary with cell 36*b* LIST_MOBILE identifies the pilot PN offsets of base station 26*b*. The channel assignment message transmitted by base stations 26*a,b* identifies a traffic channel for use by mobile station 2 for dedicated communications between base stations 26*a,b* and mobile station 2. At least one demodulator 12*a-j* is tuned to receive traffic channel information from base stations 26*a* and another demodulator 12*a-j* is tuned to receive traffic channel information from base station 26*b*. A plurality of demodulators 12*a-j* begin demodulating the traffic channel signals transmitted by base stations 26*a,b*. The demodulated signals are applied to diversity combine 34 which combines the received signals to provide an improved estimate of the transmitted data.

In practicing the method of the present invention mobile station 2 does not perform an idle handoff until it receives an acknowledgment for a transmitted message or a timeout indicating that the period for acknowledgment has expired. This permits mobile station 2 to receive the acknowledgment of its access channel probes. It also permits the base station 26*a* to which the mobile station is sending its access channel probes to generate the acknowledgment rather than the acknowledgment being generated by base station controller 32. This reduces delay, and makes the call setup process faster. Furthermore, if mobile station 2 is in the system access state and performs an idle handoff after the acknowledgment timeout expires, mobile station 2 must restart the access channel probe transmission procedures. This would be the same as if mobile station 2 transmitted a new origination message.

In an alternative embodiment, mobile station 2 performs the idle handoff to base stations in LIST_BASE 60 before receiving the acknowledgment. Thus, all base stations in LIST_BASE 60 must send the acknowledgment and base station controller 32 must help generate the acknowledgments. In a modification of this alternative embodiment mobile station 2 may perform the idle handoff to base stations in LIST_MOBILE before receiving the acknowledgment. Similarly, all base stations in LIST_MOBILE must send the acknowledgment and thus base station controller 32 must be involved in generating the acknowledgments.

In a preferred embodiment the present invention provides for the contingency that the channel assignment message was transmitted by base station 26*a* but not received by mobile station 2. Base station 26*a* may have received the origination message from mobile station 2 but mobile station 2 may not have received the channel assignment message acknowledging the receipt of the origination message from base station 26*a*. Even absent receipt of the acknowledgment message mobile station 2 may perform the idle handoff to, for example, base station 26*b*.

Base station 26*b* send the channel assignment message to mobile station 2, while mobile station 2 retransmits the origination message. In the exemplary embodiment when an acknowledgment message is sent an indication of which message is being acknowledged accompanies it. Mobile station 2 ignores the channel assignment message unless the indicator corresponds to the most recently sent origination message. The present invention includes several ways to correct this problem. One solution is for base station 26*b* to use the same acknowledgment indicator that is in the origination message received by base station 26*a*. This can be done by passing the acknowledgment indicator values from base station 26*a* to base station 26*b* through base station controller 32. In an alternative embodiment mobile station 2 can stop transmitting an access probe if it receives the channel assignment message and tune to the channel specified by the channel assignment message.

In an improved embodiment the paging channel configuration of all base stations to which mobile station 2 is allowed to handoff (base stations in LIST_BASE 60) are the same. Base stations not supporting these capabilities would not be included in LIST_BASE 60.

This method can also be used to support PACA. The PACA feature is well known in the art and is described in detail in "TIA/EIA/IS-53-A Cellular Features Description." When PACA is invoked mobile station 2 is given priority over other mobile stations in obtaining a traffic channel when a traffic channel is not available. Specifically, mobile station 2 sends an origination message containing the PACA feature code and the dialed number. If a traffic channel is immediately available, mobile station 2 is assigned to the traffic channel. If a traffic channel is not immediately available and mobile station 2 is authorized to use PACA, the base station monitoring mobile station 2 places the request of mobile station 2 into a PACA queue. For example, base station 26*a* can place the request in the queue. Alternatively, the PACA queue can be managed by base station controller 32. The position in the queue depends upon the priority of the PACA request and the age of the request. When a traffic channel becomes available, the request at the head of the PACA queue is assigned to the traffic channel.

When the request of mobile station 2 is in a PACA queue mobile station 2 can receive periodic messages informing the user of mobile station 2 of the queue status. One issue with PACA is that the infrastructure needs to know the cell which mobile station 2 is currently using in order to determine whether the channel is free. With most systems this requires mobile station 2 to register or resend the origination message every time mobile station 2 performs an idle handoff. Due to the abruptness of transitions between CDMA base stations mobile station 2 may register or resend the origination message several times while crossing the boundary between base stations. A second consideration with CDMA is that mobile station 2 may go into soft handoff soon after it is assigned to a traffic channel. Unless resources are available in multiple base stations to support the call the assignment may not be successful.

With the modified origination message described above mobile station 2 indicates other base stations that should be in the active set of the mobile, the set of base stations from which mobile station 2 has detected strong pilot signals. In one embodiment mobile station 2 sends LIST_MOBILE and the base station determines LIST_BOTH. In another embodiment, mobile station 2 sends LIST_BOTH. This permits the infrastructure to determine whether resources are free in all base stations needed for the PACA call. In order to reduce the rate of sending the origination message, the base stations in LIST_BOTH are those which the mobile station can move without having to resend the origination message. When this feature is invoked the infrastructure needs to send the queue status information in all base stations in LIST BOTH. If mobile station 2 moves out of the coverage of the base stations in LIST_BOTH, mobile station 2 resends the origination message.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for performing handoff within a mobile communication system, the mobile communication system having at least one first communication device for communicating with a plurality of second communication devices (SCD), comprising:
   means for transmitting from at least one of the SCDs to the first communication device a handoff list of SCDs to which the first communication device is permitted to handoff when in a system access state; and
   means for transmitting a channel assignment message to the at least one first communication device from each of the SCDs in the handoff list.

2. The apparatus in accordance with claim 1, wherein the channel assignment message transmitted from each SCD in the handoff list includes a channel assignment message to be used only for communicating with the respective transmitting SCD.

3. The apparatus in accordance with claim 1, further comprising means for transmitting to the first communication device a neighbor list of SCDs that are located in the geographic vicinity of the first communication device.

4. The apparatus in accordance with claim 1, further comprising means for performing a handoff of the first communication device from one of the SCDs to another one of the SCDs.

5. A communication device for communicating with a plurality of second communication devices (SCD), comprising:
   a controller; and
   a receiver for receiving from at least one of the SCDs a handoff list of SCDs to which the communication device is permitted to handoff when in a system access state, and receiving a channel assignment message from each of the SCDs in the handoff list.

6. The device in accordance with claim 5, wherein the channel assignment message received from each SCD in the handoff list includes a channel assignment message to be used only for communicating with the respective transmitting SCD.

7. The device in accordance with claim 5, wherein the receiver further receives a neighbor list of SCDs that are located in the geographic vicinity of the communication device.

8. The device in accordance with claim 5, wherein the controller performs a handoff of the communication device from one of the SCDs to another one of the SCDs.

9. An apparatus for performing handoff within a mobile communication system, the mobile communication system having at least one first communication device for communicating with a plurality of second communication devices (SCD), comprising:
   means for transmitting from at least one of the SCDs to the first communication device a handoff list to which the first communication device is permitted to handoff when in a system access state, wherein the handoff list comprises SCDs controlled by a single controller; and
   means for transmitting a channel assignment message to the at least one first communication device from each of the SCDs in the handoff list.

10. The apparatus in accordance with claim 9, wherein the single controller determines the SCDs used to transmit a channel assignment message.

11. The apparatus in accordance with claim 9, wherein the SCDs on the handoff list transmit pilot signals, the apparatus further comprising: means for measuring the energy levels of the pilot signals at the first communication device; means for transmitting the measured energy levels to the single controller; means for comparing the transmitted energy levels; and means for providing an energy level list of SCDs according to the comparison.

12. The apparatus in accordance with claim 11, further comprising means for transmitting the energy level list to the first communication device.

13. The apparatus in accordance with claim 12, further comprising means for performing a handoff according to the energy level list.

14. The apparatus in accordance with claim 13, comprising means for performing handoff only with SCDs contained in both the handoff list and the energy level list.

15. The apparatus in accordance with claim 11, further comprising means for transmitting to the first communication device a neighbor list of SCDs that are located in the geographic vicinity of the first communication device, wherein the handoff is preceded by the step of transmitting from the first communication device an origination message to at least one SCD.

16. The apparatus in accordance with claim 15, wherein the handoff list and the neighbor list are transmitted together.

17. The apparatus in accordance with claim 15, wherein the neighbor list comprises SCDs controlled by a plurality of controllers.

18. The apparatus in accordance with claim 15, wherein the SCDs on the handoff list comprise a subset of the SCDs on the neighbor list.

19. The apparatus in accordance with claim 9, further comprising means for performing a handoff of the first communication device from one of the SCDs to another one of the SCDs when the first communication device is in an idle mode.

20. The apparatus in accordance with claim 9, further comprising means for synchronizing by the first communication device with at least one of the SCDs.

21. A method for a communication device for communicating with a plurality of second communication devices (SCD), comprising:
   receiving from at least one of the SCDs a handoff list of SCDs to which the communication device is permitted to handoff when in a system access state; and
   receiving a channel assignment message from each of the SCDs in the handoff list.

22. The method in accordance with claim 21, wherein the channel assignment message received from each SCD in the handoff list includes a channel assignment message to be used only for communicating with the respective transmitting SCD.

23. The method in accordance with claim 21, further comprising:
   receiving a neighbor list of SCDs that are located in the geographic vicinity of the communication device.

24. The method in accordance with claim 21, further comprising:
   performing a handoff of the communication device from one of the SCDs to another one of the SCDs.

* * * * *